US008078459B2

(12) United States Patent
Dai

(10) Patent No.: US 8,078,459 B2
(45) Date of Patent: Dec. 13, 2011

(54) METHOD AND DEVICE FOR UPDATING STATUS OF SYNTHESIS FILTERS

(75) Inventor: Jinliang Dai, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 12/815,028

(22) Filed: Jun. 14, 2010

(65) Prior Publication Data

US 2010/0318367 A1 Dec. 16, 2010

Related U.S. Application Data

(63) Continuation of application No. 12/502,589, filed on Jul. 14, 2009, which is a continuation of application No. PCT/CN2008/072477, filed on Sep. 23, 2008.

(30) Foreign Application Priority Data

Jan. 18, 2005 (CN) .......................... 2008 1 0056499

(51) Int. Cl.
*G01L 19/00* (2006.01)
*G01L 21/00* (2006.01)
*G10L 21/04* (2006.01)

(52) U.S. Cl. ......... 704/223; 704/201; 704/219; 704/500

(58) Field of Classification Search ................... 704/223
See application file for complete search history.

(56) References Cited

U.S. PATENT DOCUMENTS

| | | | |
|---|---|---|---|
| 5,899,967 | A | 5/1999 | Nagasaki |
| 6,012,024 | A | 1/2000 | Hofmann |
| 6,173,265 | B1 | 1/2001 | Takahashi |
| 6,510,407 | B1 | 1/2003 | Wang |
| 7,496,505 | B2 | 2/2009 | Manjunath et al. |
| 7,672,837 | B2 | 3/2010 | Bessette et al. |
| 2007/0071253 | A1 | 3/2007 | Sato et al. |
| 2008/0052068 | A1 | 2/2008 | Aguilar et al. |

FOREIGN PATENT DOCUMENTS

| | | | |
|---|---|---|---|
| CN | 1179848 | A | 4/1998 |
| CN | 1875403 | A | 12/2006 |
| CN | 101000768 | A | 7/2007 |

(Continued)

OTHER PUBLICATIONS

Supplemental International Search Report from the Munich Patent Office issued in EP 08860832 dated Nov. 25, 2009.

(Continued)

*Primary Examiner* — Justin Rider

(74) *Attorney, Agent, or Firm* — Finnegan, Henderson, Farabow, Garrett & Dunner LLP

(57) ABSTRACT

A method and device for updating statuses of synthesis filters are provided. The method includes: exciting a synthesis filter corresponding to a first encoding rate by using an excitation signal of the first encoding rate, outputting reconstructed signal information, and updating status information of the synthesis filter and a synthesis filter corresponding to a second encoding rate. In the present disclosure, the status of the synthesis filter corresponding to the current rate and the statuses of the synthesis filters at other rates are updated. Thus, synchronization between the statuses of the synthesis filters corresponding to different rates at the encoding terminal may be realized, thereby facilitating the consistency of the reconstructed signals of the encoding and decoding terminals when the encoding rate is switched, and improving the quality of the reconstructed signal of the decoding terminal.

10 Claims, 8 Drawing Sheets

FOREIGN PATENT DOCUMENTS

JP 2003-186487 A 7/2003

OTHER PUBLICATIONS

Itu-T, "G.729-based embedded variable bit-rate coder: An 8-32 kbit/s scalable wideband coder bitstream interoperable with G.729", Series G: Transmission Systems and Media, Digital Systems and Networks, Digitital terminal equipments—Coding of analogue signals by methods other than PCM, No. G.7.29.1, XP-017404590, pp. 1-84, (May 29, 2006).

Ragot, et al., "ITU-T G.729.1: An 8-32 Kbit/S Scalable Coder Interoperable With G.729 for Wideband Telephony and Voice Over IP", IEEE, XP-031463903, pp. IV-529 to IV-532, (Apr. 15, 2007).

Taddei, et al., "A Scalable Three Bitrate (8, 14.2, and 24 kbit/s) Audio Coder", Proceedings AES, XP-002555806, pp. 1-12, (Sep. 24, 1999).

3GPP Ts 26.190, "3rd Generation Partnership Project Technical Specification Group Services and System Aspects Speech Codec speech processing functions AMR Wideband speech codes; Transcoding functions (Release 5)", V5.1.0, XP-002292117, pp. 1-53, (Dec. 1, 2001).

G.729.1 Amendment 4, "G.729-based embedded variable bit-rate coder: An 8-32 kbit/s scalable wideband coder bitstream interoperable with G.729: New Annex C (DTX/CNG scheme) plus corrections to main body and Annex B", Series G: Transmission Systems and Media, Digital Systems and Networks, XP-002526623, pp. 1-36, (Jun. 1, 2008).

International Search Report from P.R. China in International Application No. PCT/CN2008/072477 mailed Jan. 8, 2009.

Office Action issued in Chinese Patent Application No. 200810056499, Jun. 10, 2010.

3GPP TS 26.190 V6.0.0 3rd Generation Partnership Project; Technical Specification Group Services and System Aspects; Speech codec speech processing functions; Adaptive Multi-Rate—Wideband (AMR-WB) speech codec; Transcoding functions (Release 6) Dec. 2004.

NCS Technical Information Bulletin FS 1016 CELP Speech Coding @ 4800 bps, Details to Assist in Implementation of Federal Standard 1016 CELP. National Communications System, Office of Technology & Standards, Technical Information Bulletin 92-1, 43 pages (1992).

Office Action dated (mailed) Feb. 1, 2011, issued in related U.S. Appl. No. 12/502,589 Huawei Technologies C., Ltd.

METHOD AND DEVICE FOR UPDATING STATUS OF SYNTHESIS FILTERS

CROSS-REFERENCE TO RELATED APPLICATIONS

This application is a continuation of U.S. patent application Ser. No. 12/502,589, filed on Jul. 14, 2009, which is a continuation of International Patent Application No. PCT/CN2008/072477, filed on Sep. 23, 2008, titled "method and device for updating status of synthesis filters", which claims the priority of CN application No. 200810056499.2, filed on Jan. 18, 2008, titled "method and device for updating status of synthesis filters", the entire contents of all of which are incorporated herein by reference.

FIELD OF THE INVENTION

The present disclosure relates to the field of encoding and decoding technology, and more particularly to a method and device for updating statuses of synthesis filters.

BACKGROUND

Code excited linear prediction (CELP) encoding technology may be understood to be a medium-to-low-rate speech compression coding technology, which takes a codebook as an excitation source, and has advantages such as low rate, high quality of synthesized speech, and strong noise immunity, such that it can be widely applied as a mainstream coding technology at the coding rate of 4.8-16 kb/s. FIG. 1 is a systematic block diagram of a CELP speech encoding terminal, and FIG. 2 is a systematic block diagram of a CELP speech decoding technology. As shown in FIG. 1, an input speech signal may be preprocessed, and then a linear prediction coding (LPC) analysis may be performed on the signal to obtain spectrum parameters, which are corresponding to a coefficient of a synthesis filter. A fixed codebook contribution and an adaptive codebook contribution may be mixed to serve as the excitation of the synthesis filter. The synthesis filter outputs a reconstructed signal, consistent with the output of the synthesis filter of the decoding terminal in FIG. 2. A perceptual weighting is performed on a residual difference between the reconstructed signal and the preprocessed signal, and an analysis-by-synthesis search is performed to respectively find adaptive codebook parameters and fixed codebook parameters to be used for the excitation of the filter.

G.729.1 represents a latest new generation speech encoding/decoding standard. This embedded speech encoding/decoding standard may be characterized by layered coding that can be capable of providing an audio quality from narrowband to wideband in a bit rate range of 8 kb/s-32 kb/s; As such, it can be well adaptive to a channel as it allows to discard outer layer code streams according to the channel condition during the transmission, FIG. 3 is a systematic block diagram of a G.729.1 encoder, and FIGS. 4A and 4B are a systematic block diagram of a G.729.1 decoder. Referring to FIGS. 3, 4A, and 4B the encoding/decoding of a core layer of the G.729.1 can be based on a CELP model. It can be known from FIG. 3 that, when the encoding rate is higher than 14 kb/s, a time-domain aliasing cancellation (TDAC) coder may be activated to encode a residual signal between a low sub-band input signal and a signal locally synthesized by the CELP encoder at a bit rate of 12 kb/s and a high sub-band signal, respectively. It can be known from FIGS. 4A and 4B that, when the decoding rate is higher than 14 kb/s, the decoding terminal should respectively decode signal components of the high sub-band and the low sub-band, a TDAC decoder then decodes a residual signal component of the low sub-band, and the residual signal component is added with a low band signal component reconstructed by a CELP decoder to obtain a final reconstructed low band signal component. As the TDAC encoding algorithm utilizes the reconstructed signal component of the CELP encoder at the encoding terminal, and at the same time, the TDAC decoding algorithm utilizes the reconstructed signal component of the CELP decoder at the decoding terminal, the synchronization between the reconstructed signal of the CELP encoding terminal and the reconstructed signal of the CELP decoding terminal provides a method of ensuring the correctness of the TDAC encoding/decoding algorithm. In order to ensure the synchronization between the reconstructed signals of the encoding and decoding terminals, the synchronization between the status of the CELP encoder and the status of the CELP decoder should be ensured.

FIG. 5 is a schematic structural view of a CELP encoder in G.729.1 in the prior art, and FIG. 6 is a schematic structural view of a CELP decoder in G.729.1 in the prior art. Referring to FIG. 5, the CELP model used for the narrowband portion in G.729.1 can support two rates, namely, 8 kb/s and 12 kb/s, and the synthesis filter for reconstructing the narrowband signal component in the encoding terminal respectively reserves two status rates, namely, 8 kb/s and 12 kb/s. In the encoding terminal, if the current encoding rate is 8 kb/s, a core-layer excitation signal calculated by a core-layer G.729 encoder is used to excite a synthesis corresponding to 8 kb/s, and the status of the synthesis filter is updated. If the current encoding rate is equal to or higher than 12 kb/s, an enhancement layer excitation signal is used to excite a synthesis filter corresponding to 12 kb/s, and the status of the synthesis filter is updated. Referring to FIG. 6, the decoding terminal utilizes one synthesis filter, calculates a corresponding excitation according to the received actual code stream, performs synthesis filtering, and updates the status of the filter. The synthesis filters at two encoding rates at the encoding terminal and the synthesis filter at the decoding terminal uses the same quantized LPC filter coefficient.

As for the two encoding rates, namely, 8 kb/s and 12 kb/s, the encoding terminal adopts two independent excitation synthesis modules to generate corresponding excitations, performs synthesis filtering on the corresponding synthesis filters, and updates the synthesis filters. The decoding terminal adopts one synthesis filter, calculates the excitation signal according to the received parameter, performs synthesis filtering, and updates the synthesis filter. If the encoding rate is not switched between 8 kb/s and 12 kb/s, the reconstructed signals of the encoding and decoding terminals are fully synchronous. However, if the switching between the two encoding rates occurs, the synchronization between the reconstructed signals of the encoding and decoding terminals cannot be ensured, thus affecting the correctness of the encoding/decoding algorithm, and eventually affecting the quality of the reconstructed signal of the decoding terminal.

SUMMARY

Accordingly, the embodiments of the present disclosure are directed to a method and device for updating statuses of synthesis filters, adapted to eliminate the defect in the prior art that, when the CELP encoder switches between different encoding rates, the asynchronism between the reconstructed signals of the encoding and decoding terminals affects the quality of the reconstructed signal at the decoding terminal, so as to realize the synchronization between the status of the CELP encoder and the status of the CELP decoder and ensure the consistency of the reconstructed signals of the encoding and decoding terminals when switching the encoding rate is switched.

The present disclosure provides a method for updating statuses of synthesis filters. The method includes: exciting a synthesis filter corresponding to a first encoding rate by using an excitation signal of the first encoding rate; outputting reconstructed signal information; and updating status information of the synthesis filter and a synthesis filter corresponding to a second encoding rate.

The present disclosure provides a device for updating statuses of synthesis filters. The device includes a plurality of synthesis filters and a status updating module. The status updating module may be adapted to excite a synthesis filter corresponding to a first encoding rate by using an excitation signal of the first encoding rate, output reconstructed signal information, and update status information of the synthesis filter and a synthesis filter corresponding to a second encoding rate.

With the method and device for updating statuses of synthesis filters according to the embodiments of the present disclosure, an independent synthesis filter may be used at each encoding rate during the encoding process, and after each frame is encoded, not only the status of the synthesis filter corresponding to the current rate is updated, but also the statuses of the synthesis filters at other rates is updated. Thus, the synchronization between the statuses of the synthesis filters corresponding to different rates at the encoding terminal may be realized, thereby facilitating the consistency of the reconstructed signals of the encoding and decoding terminals when the encoding rate is switched, and improving the quality of the reconstructed signal of the decoding terminal.

DETAILED DESCRIPTION OF THE EMBODIMENTS

The technical solution according to the present disclosure is described below with reference to the embodiments and accompanying drawings.

Embodiment of a Method for Updating Statuses of Synthesis Filters

In the speech encoding/decoding standard G.729.1, the CELP encoder used for the narrowband portion supports two encoding rates, namely, 8 kb/s and 12 kb/s. The reconstruction of narrowband signal components may be performed by using two independent synthesis filters corresponding to the two encoding rates. Meanwhile, the updating of statuses of the two synthesis filters may not be performed independently; instead, after the synthesis filter corresponding to the current encoding rate is excited by using the excitation signal of the current encoding rate, and reconstructed signal information is output, both the status information of the synthesis filter corresponding to the current encoding rate and the status information of synthesis filters corresponding to other encoding rates may be updated. As for the CELP model used for the narrowband portion of G.729.1, if the current encoding rate is 8 kb/s, after updating the status information of the synthesis filter corresponding to 8 kb/s by using the output information of the synthesis filter corresponding to 8 kb/s, the status information of the synthesis filter corresponding to the encoding rate of 12 kb/s may also need to be updated. If the current encoding rate is 12 kb/s or higher, after updating the status information of the synthesis filter corresponding to 12 kb/s by using the output result information of the synthesis filter corresponding to 12 kb/s, the status information of the synthesis filter corresponding to 8 kb/s may also need to be updated. Therefore, the synchronization between the statuses of synthesis filters at the encoding terminal can be maintained when the encoding rate is switched between 8 kb/s and 12 kb/s, thus ensuring the consistency of narrowband signal components reconstructed by the encoding and decoding terminals.

Figure 1:
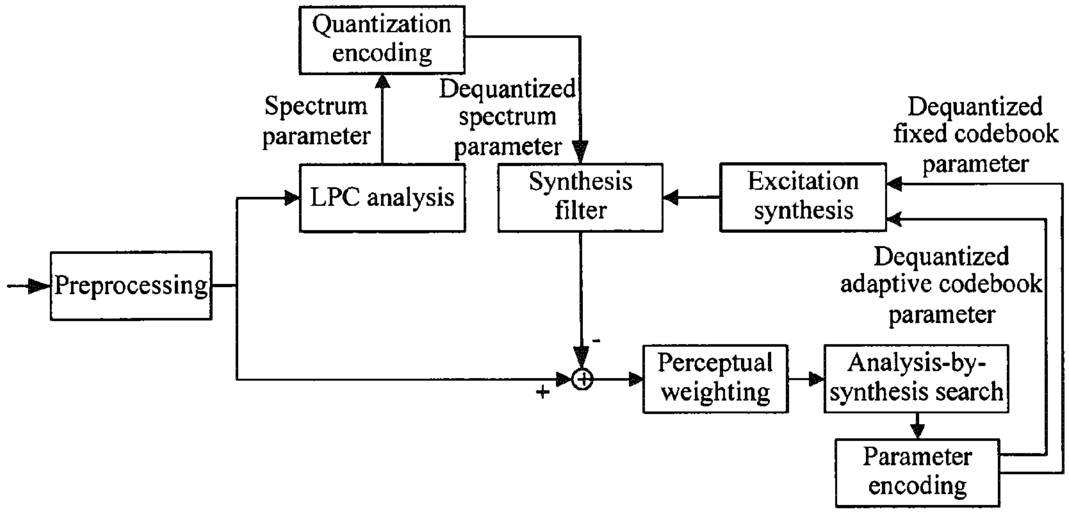
FIG. 1 (Prior Art)
FIG. 1 is a systematic block diagram of a CELP speech encoding terminal.
Figure 2:
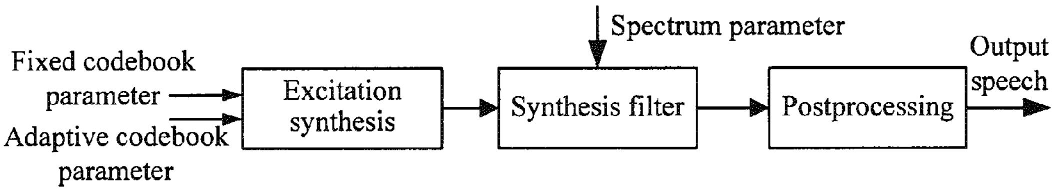
FIG. 2 (Prior Art)
FIG. 2 is a systematic block diagram of a CELP speech decoding technology.
Figure 3:
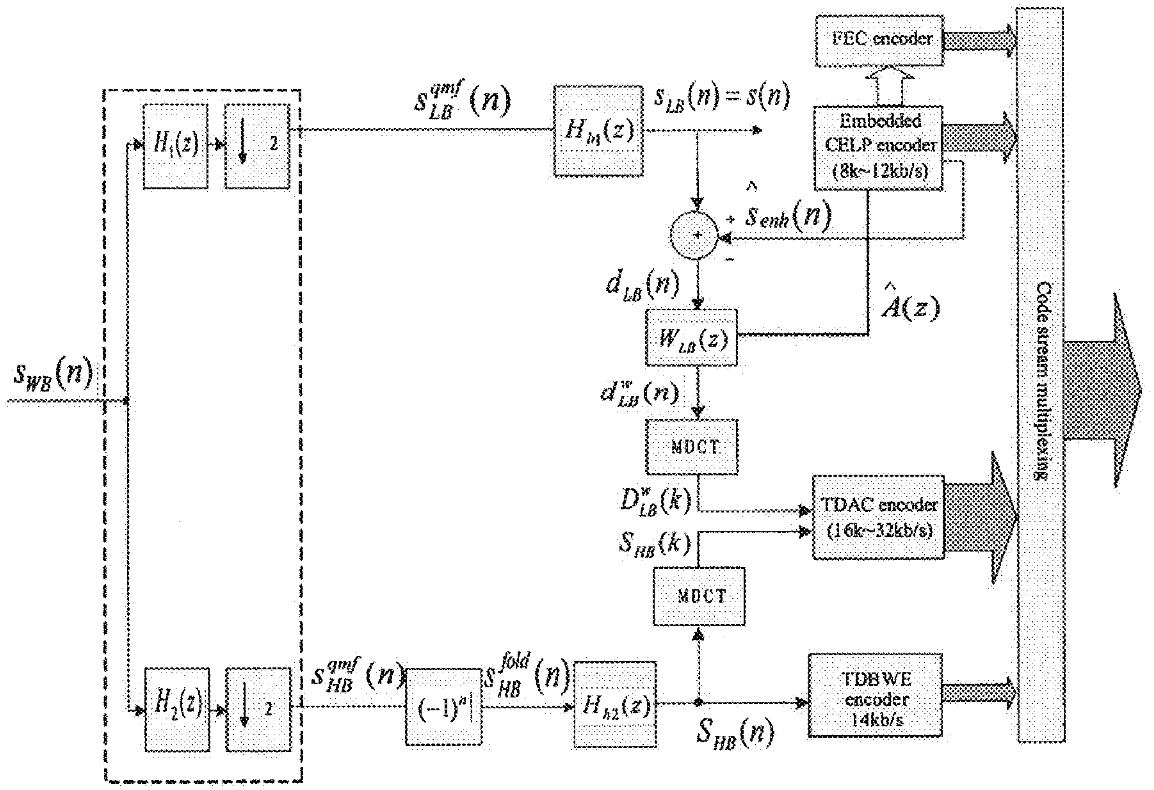
FIG. 3 is a systematic block diagram of a G.729.1 encoder.
Figure 4A:
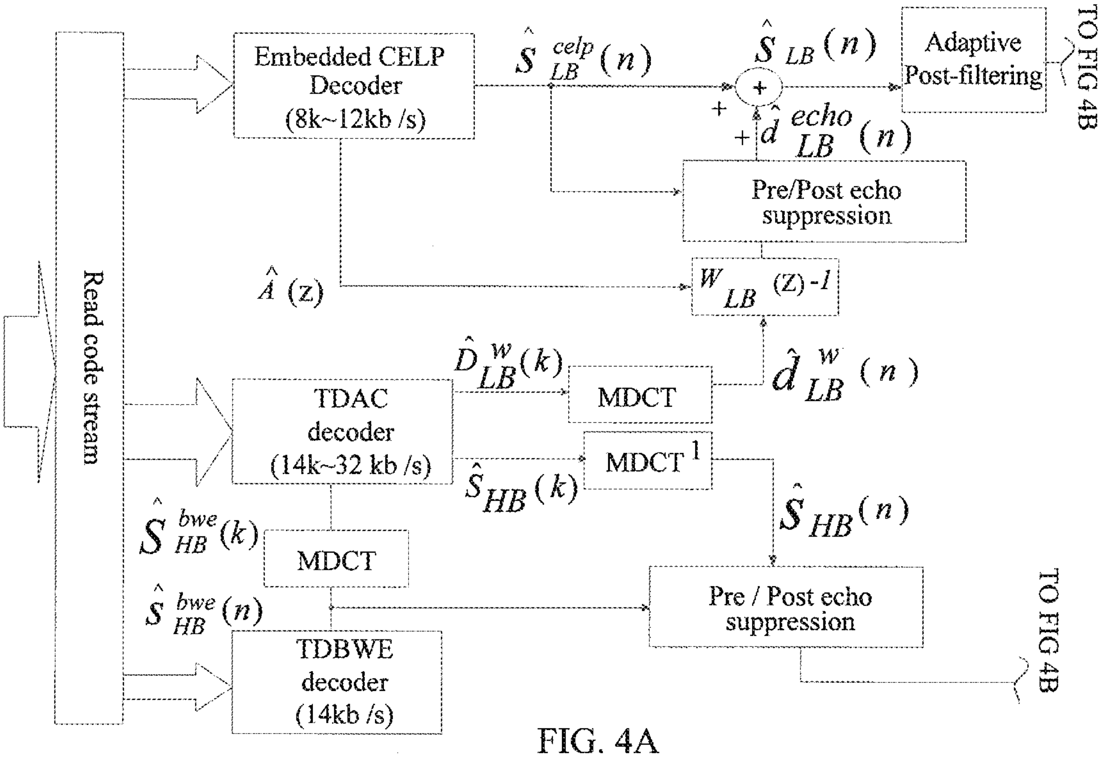
FIGS. 4A and 4B are a systematic block diagram of a G.729.1 decoder.
Figure 4B:
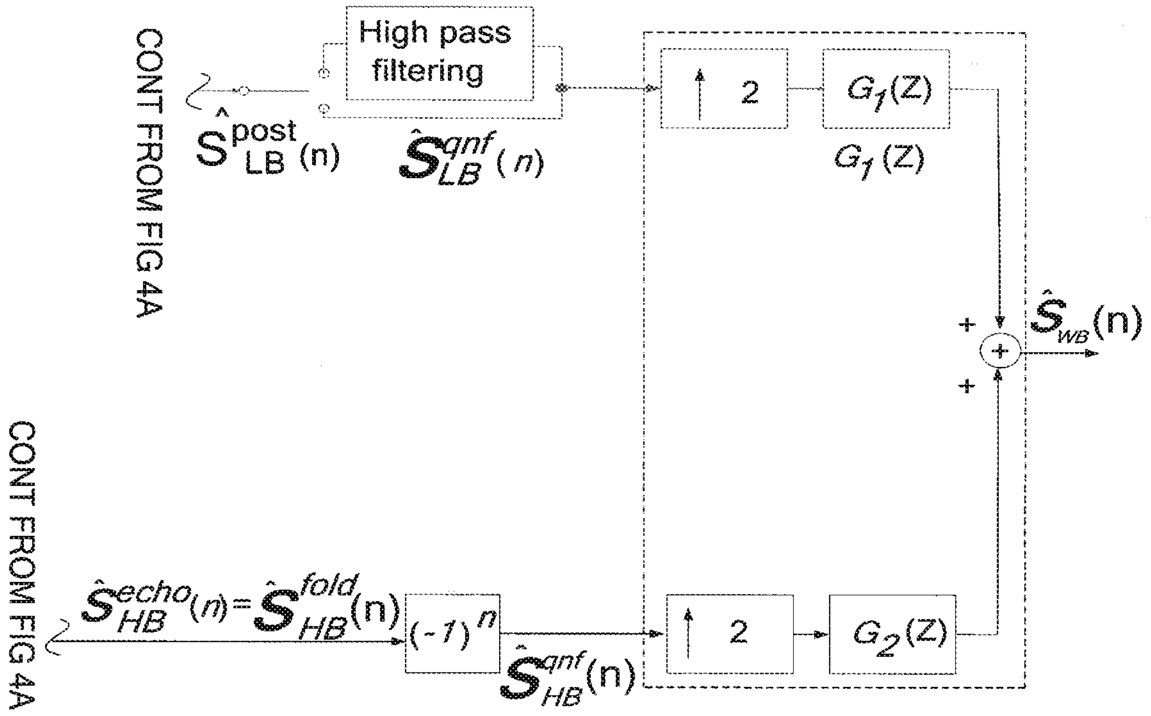
Figure 5:
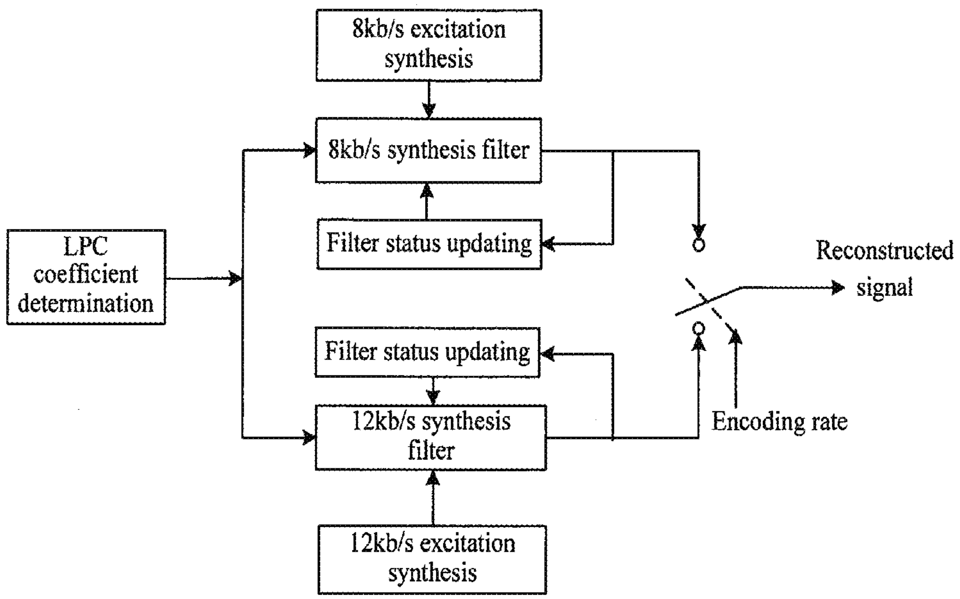
FIG. 5 (Prior Art)
FIG. 5 is a schematic structural view of a CELP encoder in G.729.1 in the prior art.
Figure 6:
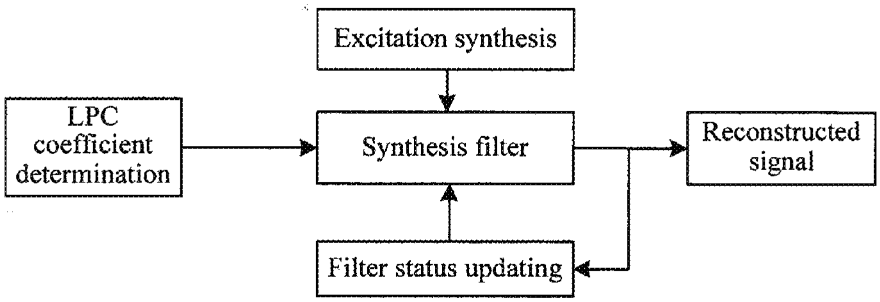
FIG. 6 (Prior Art)
FIG. 6 is a schematic structural view of a CELP decoder in G.729.1 in the prior art.
Figure 7:
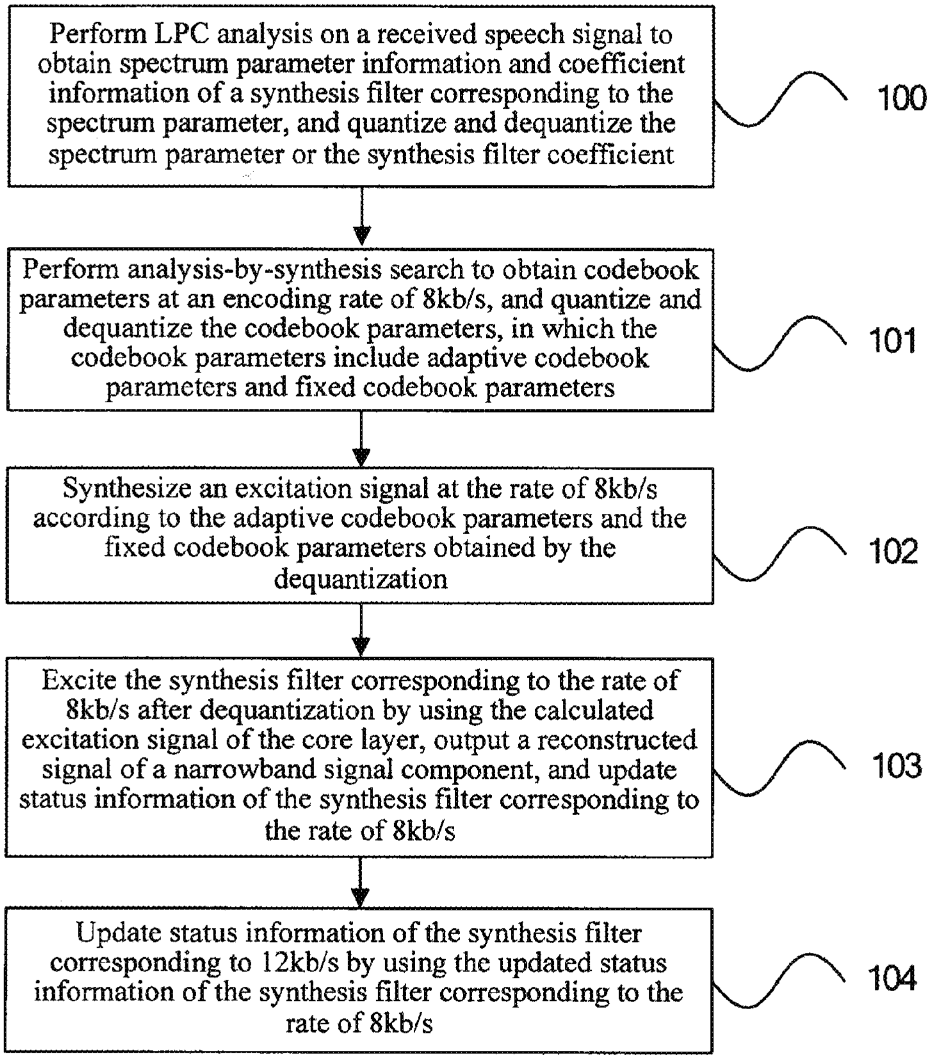
FIG. 7 is a flow chart of a method for updating statuses of synthesis filters according to a first embodiment of the present disclosure.

FIG. 7 is a flow chart of a method for updating statuses of synthesis filters according to a first embodiment. Referring to FIG. 7, if the current encoding rate is 8 kb/s, it may use the G.729 encoder to encode the narrowband signal component into 8 kb/s code streams, i.e., Layer 1 in Table 1 is involved, and the encoding process may be described as follows.

In Step 100, an LPC analysis may be performed on a received speech signal to obtain spectrum parameter information and coefficient information of a synthesis filter corresponding to the spectrum parameter, and the spectrum parameter or the synthesis filter coefficient is quantized and dequantized.

In Step 101, an analysis-by-synthesis search may be performed to obtain codebook parameters at an encoding rate of 8 kb/s and the codebook parameters are quantized and dequantized. Here, the codebook parameters include adaptive codebook parameters and fixed codebook parameters.

In Step 102, an excitation signal at the rate of 8 kb/s may be synthesized according to the adaptive codebook parameters and the fixed codebook parameters obtained by the dequantization.

In Step 103, the synthesis filter corresponding to the rate of 8 kb/s after dequantization may be excited by using the calculated excitation signal of a core layer, a reconstructed signal of a narrowband signal component is output, and status information of the synthesis filter corresponding to the rate of 8 kb/s may be updated by using the reconstructed signal information.

In Step 104, status information of the synthesis filter corresponding to 12 kb/s may be updated by using the updated status information of the synthesis filter corresponding to the rate of 8 kb/s.

The updated status of the synthesis filter corresponding to the rate of 8 kb/s may be used to overwrite the status of the synthesis filter corresponding to 12 kb/s, or the status of the synthesis filter corresponding to 12 kb/s is directly updated by using the reconstructed signal synthesized by the synthesis filter corresponding to the rate of 8 kb/s in the Step 104.

The speech signal received in the Step 100 is preprocessed. In the Step 103, after the reconstructed signal of the narrowband signal component is output, residual difference information may be obtained according to the reconstructed signal and the preprocessed speech signal; and after performing perceptual weighting on the residual difference information, the residual difference information may be returned to the Step 101 to perform the analysis-by-synthesis search. Therefore, the analysis-by-synthesis search functions as a closed loop. Table 1 represents a bit allocation table for a used frame structure of a 20 ms frame size encoded at full rate.

TABLE 1

| | 10 ms frame 1 | | 10 ms frame 2 | | Total |
|---|---|---|---|---|---|
| Line Spectrum Pairs (LSP) | 18 | | 18 | | 36 |
| | subframe1 | subframe2 | subframe1 | subframe2 | |
| Layer 1 - Core Layer (narrowband embedded CELP, 8 kb/s) | | | | | |
| Adaptive codebook delay | 8 | 5 | 8 | 5 | 26 |
| Fundamental tone delay odd-even check | 1 | | 1 | | 2 |
| Fixed codebook index | 13 | 13 | 13 | 13 | 52 |
| Fixed codebook symbol | 4 | 4 | 4 | 4 | 16 |
| Codebook gain (first stage) | 3 | 3 | 3 | 3 | 12 |
| Codebook gain (second stage) | 4 | 4 | 4 | 4 | 16 |
| Total for 8 kb/s core layer | 160 | | | | |
| Lay 2 - Narrowband Enhancement layer (narrowband embedded CELP, 12 kb/s) | | | | | |
| Second stage fixed codebook index | 13 | 13 | 13 | 13 | 52 |
| Second stage fixed codebook symbol | 4 | 4 | 4 | 4 | 16 |
| Second stage fixed codebook gain | 3 | 2 | 3 | 2 | 10 |
| Error correction bit (type information) | | 1 | | 1 | 2 |
| Total for 12 kb/s enhancement layer | 80 | | | | |
| Layer 3 - Wideband Enhancement layer (TDBWE, 14 kb/s) | | | | | |
| Time domain envelope average | 5 | | | | 5 |
| Time domain envelope split vector | 7 + 7 | | | | 14 |
| Frequency domain envelope split vector | 5 + 5 + 4 | | | | 14 |
| Error correction bit (phase information) | 7 | | | | 7 |
| Total for 14 kb/s enhancement layer | 40 | | | | |
| Layers 4-12 - Wideband Enhancement layer (TDAC, 16 kb/s and higher) | | | | | |
| Error correction bit (energy information) | 5 | | | | 5 |
| MDCT normalization factor | 4 | | | | 4 |
| High band spectrum envelope | nbits_HB | | | | nbits_HB |
| Low band spectrum envelope | nbits_LB | | | | nbits_LB |
| Fine structure | nbits_VQ = 351 − nbits_HB − nbits_LB | | | | nbits_VQ |
| Total for 16-32 kb/s enhancement layer | 360 | | | | |
| Total | 640 | | | | |

Figure 8:
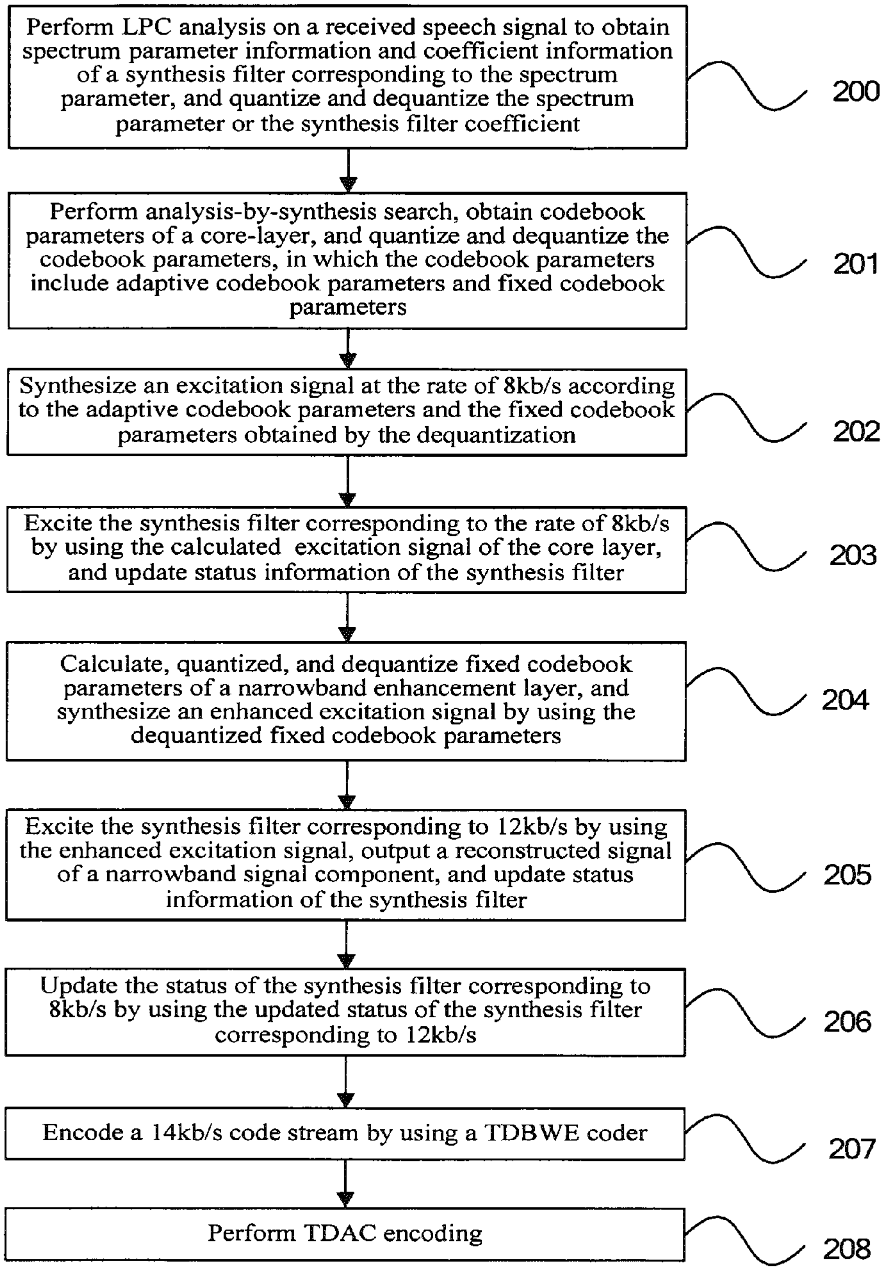
FIG. 8 is a flow chart of a method for updating statuses of synthesis filters according to a second embodiment of the present disclosure.

FIG. 8 is a flow chart of a method for updating statuses of synthesis filters according to a second embodiment. When the encoding rate changes from the original 8 kb/s to 12 kb/s or higher, the encoding process may be illustrated in this embodiment by taking the encoding rate changed to 32 kb/s as an example, and has the following steps as shown in FIG. 8.

In Step 200, an LPC analysis may be performed on the received speech signal to obtain spectrum parameter information and coefficient information of the synthesis filter corresponding to the spectrum parameter, and the spectrum parameter or the synthesis filter coefficient is quantized and dequantized.

In Step 201, an analysis-by-synthesis search may be performed to obtain codebook parameters of the core layer, and the codebook parameters are quantized and dequantized. Here, the codebook parameters include adaptive codebook parameters and fixed codebook parameters.

In Step 202, an excitation signal at the rate of 8 kb/s may be synthesized according to the adaptive codebook parameters and the fixed codebook parameters obtained by the dequantization.

In Step 203, the synthesis filer corresponding to 8 kb/s may be excited by using the calculated excitation signal of the core layer, and status information of the synthesis filter is updated.

In Step 204, fixed codebook parameters of a narrowband enhancement layer can be calculated, quantized, and dequantized, and an enhanced excitation signal may be synthesized by using the dequantized fixed codebook parameters.

In Step 205, the synthesis filter corresponding to 12 kb/s may be excited by using the enhanced excitation signal, a reconstructed signal of a narrowband signal component may be output, and status information of the synthesis filter may be updated.

In Step 206, the status of the synthesis filter corresponding to 8 kb/s may be updated by using the updated status of the synthesis filter corresponding to 12 kb/s.

The updated status of the synthesis filter corresponding to the rate of 12 kb/s may be used to overwrite the status of the synthesis filter corresponding to 8 kb/s, or the status of the synthesis filter corresponding to 8 kb/s may be directly updated by using the reconstructed signal synthesized by the synthesis filter corresponding to the rate of 12 kb/s in the Step 206.

In Step 207, a 14 kb/s code stream may be encoded by using a TDBWE encoder.

In Step 208, a TDAC coding may be performed on a difference signal between the signal received in the Step 200 and the reconstructed signal calculated in the Step 205, and a high band signal component.

As the decoding terminal may use one synthesis filter and perform continuous updating, after the encoding terminal finishes the operation of the Step 206, the consistency of the narrowband signal component reconstructed in the Step 205 and the narrowband signal component reconstructed by the decoding terminal may be facilitated, thus facilitating the correctness of the reconstructed signal of the decoding terminal.

It can be known from the above embodiments that, it may be allowed to use an independent synthesis filter at each encoding rate during the encoding process; and after every frame is encoded, not only the status information of the synthesis filter corresponding to the current encoding rate is updated, but also the status information of synthesis filters corresponding to other encoding rates is updated. Thus, the synchronization between the statuses of the synthesis filters corresponding to different encoding rates at the encoding terminal may be maintained, thereby facilitating the consistency of the reconstructed signal of the encoding and decoding terminals when the encoding rate is switched, and improving the quality of the reconstructed signal of the decoding terminal.

A method for updating statuses of synthesis filters according to a third embodiment adopts DTX/CNG technology, a frame structure of the used full rate speech frame represented in Table 1, and a frame structure of a used full rate noise frame represented in Table 2. In this embodiment, when the speech frame is encoded, the status information of the synthesis filters respectively corresponding to encoding rates of 12 kb/s and 8 kb/s may be updated by using each other through the same processing method as described in the above embodiments. In the circumstance of switching between the noise frame and the speech frame, if the speech frame is encoded at an encoding rate higher than 12 kb/s, and the synthesis filter corresponding to 8 kb/s is used to perform synthesis filtering when encoding the noise frame information, in order to avoid the asynchronism between the narrowband signal components reconstructed by the encoding and decoding terminals, when the encoder reconstructs the noise signal, not only status information of the used synthesis filter corresponding to the 8 kb/s is updated, but also status information of the synthesis filter corresponding to 12 kb/s is updated by using the updated status information of the synthesis filter corresponding to 8 kb/s. Thus, the synchronization between the statuses of the synthesis filters at the encoding terminal may be allowed, thereby allowing the synchronization between the narrowband signal components reconstructed by the encoding and decoding terminals.

TABLE 2

| Parameter description | Bit allocation | Layered structure |
|---|---|---|
| LSF parameter quantizer index | 1 | Narrowband core layer |
| First stage LSF quantization vector | 5 | |
| Second stage LSF quantization vector | 4 | |
| Energy parameter quantization value | 5 | |
| Energy parameter second stage quantization value | 2 | Narrowband enhancement layer |
| Third stage LSF quantization vector | 4 | |
| Wideband component time domain envelope | 6 | Wideband core layer |
| Wideband component frequency domain envelope vector 1 | 6 | |
| Wideband component frequency domain envelope vector 2 | 6 | |
| Wideband component frequency domain envelope vector 3 | 6 | |

Although the description of the CELP encoder in the above embodiments only introduces that the CELP encoder supports two encoding rates, i.e., 8 kb/s and 12 kb/s, the method for updating statuses of synthesis filters may not be limited to the switching between the two encoding rates, but may also be applicable to more CELP encoding rates, as long as the status information of the synthesis filters at different encoding rates is processed synchronously.

Those of ordinary skill in the art should understand that all or a part of the steps of the method according to the embodiments may be implemented by a program instructing relevant hardware. The program may be stored in a computer readable storage medium. When the program is executed, the steps of the method according to the embodiments may be performed. The storage medium may be any medium that can be capable of storing program codes, such as a ROM, a RAM, a magnetic disk, and an optical disk.

Embodiment of a Device for Updating Statuses of Synthesis Filters

The device for updating statuses of synthesis filters includes a plurality of synthesis filters and a status updating module. The status updating module may be adapted to excite a synthesis filter corresponding to a first encoding rate by using an excitation signal of the first encoding rate, output reconstructed signal information, and update status information of the synthesis filter and a synthesis filter corresponding to a second encoding rate.

Further, the status updating module may have different configurations, depending on different updating methods. For example, the status updating module may include a first updating sub-module adapted to update the status information of the synthesis filter corresponding to the first encoding rate by using the reconstructed signal information, and a second updating sub-module adapted to update the status information of the synthesis filter corresponding to the second encoding rate by using the updated status information of the synthesis filter corresponding to the first encoding rate. Alternatively, the status updating module may include a first updating sub-module adapted to update the status information of the synthesis filter corresponding to the first encoding rate by using the reconstructed signal information, and a third updating sub-module adapted to update the status information of the synthesis filter corresponding to the second encoding rate by using the reconstructed signal information.

Figure 9:
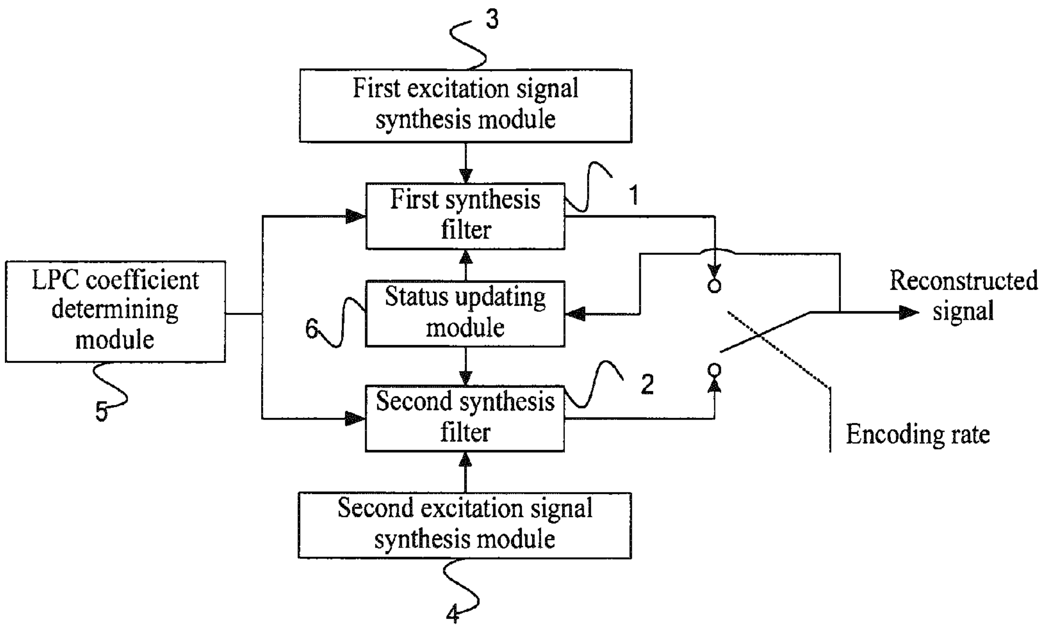
FIG. 9 is a schematic structural view of a device for updating statuses of synthesis filters according to an embodiment of the present disclosure.

FIG. 9 is a schematic structural view of a device for updating statuses of synthesis filters according to an embodiment, and particularly, a schematic structural view of a CELP encoder in G.729.1. Referring to FIG. 9, a first synthesis filter 1 and a second synthesis filter 2 that are independent of each other are used as synthesis filters corresponding to the encoding rates of 8 kb/s and 12 kb/s, and a first excitation signal synthesis module 3 and a second excitation signal synthesis module 4 that are independent of each other are used to excite the corresponding synthesis filters. A synthesis filter may be selected according to the current encoding rate. After an LPC coefficient determining module 5 determines an LPC coefficient, the selected synthesis filter may be used to reconstruct a narrowband signal component and output reconstructed signal information, and a status updating module 6 updates the status of the synthesis filter corresponding to the current encoding rate, e.g., 8 kb/s, by using the reconstructed signal. Thereafter, the status updating module 6 updates the status of the synthesis filter corresponding to the encoding rate of 12 kb/s by using the updated status of the synthesis filter, so that the status of the first synthesis filter 1 and the status of the second synthesis filter 2 may be maintained synchronous.

The decoding terminal may simply adopt a synthesis filter having the same structure as that of the CELP decoder in G.729.1 in the prior art. With the device for updating statuses of synthesis filters provided in this embodiment, the status updating module simultaneously updates the statuses of synthesis filters corresponding to different encoding rates in the encoder. Thus, the synchronization between the statuses of the synthesis filters corresponding to different encoding rates at the encoding terminal may be allowed, thereby allowing the consistency of the reconstructed signals of the encoding and decoding terminals when the encoding rate is switched, thus improving the quality of the reconstructed signal of the decoding terminal.

It will be apparent to those skilled in the art that various modifications and variations can be made to the disclosure without departing from the scope or spirit of the disclosure. In view of the foregoing, it is intended that the disclosure cover modifications and variations of this disclosure provided that they fall within the scope of the following claims and their equivalents.

What is claimed is:

1. A method for updating statuses of synthesis filters, comprising:

- performing an analysis on a received speech signal to obtain codebook parameters;
- synthesizing an excitation signal of a first encoding rate;
- exciting a first synthesis filter corresponding to the first encoding rate by using the excitation signal of the first encoding rate;
- outputting a reconstructed signal of a narrowband signal component; and
- updating status information of the first synthesis filter and status information of a second synthesis filter corresponding to a second encoding rate by using information of the reconstructed signal of the narrowband signal component.

2. The method for updating statuses of synthesis filters according to claim 1, wherein the updating the status information of the first synthesis filter and the status information of the second synthesis filter comprises:

- updating the status information of the first synthesis filter by using the information of the reconstructed signal of the narrowband signal component; and
- updating the status information of the second synthesis filter by using the updated status information of the first synthesis filter.

3. The method for updating statuses of synthesis filters according to claim 2, wherein the first encoding rate is 8 kb/s and the second encoding rate is 12 kb/s.

4. The method for updating statuses of synthesis filters according to claim 2, wherein the first encoding rate is 12 kb/s and the second encoding rate is 8 kb/s.

5. The method for updating statuses of synthesis filters according to claim 1, wherein the updating the status information of the first synthesis filter and the status information of the second synthesis filter corresponding to the second encoding rate comprises:

- updating the status information of the first and second synthesis filters by using the information of the reconstructed signal of the narrowband signal component.

6. The method for updating statuses of synthesis filters according to claim 5, wherein the first encoding rate is 8 kb/s and the second encoding rate is 12 kb/s.

7. The method for updating statuses of synthesis filters according to claim 5, wherein the first encoding rate is 12 kb/s and the second encoding rate is 8 kb/s.

8. A device for updating statuses of synthesis filters, comprising:

- excitation signal synthesis module, adapted to perform an analysis on a received speech signal to obtain codebook parameters and synthesize an excitation signal of a first encoding rate;
- a plurality of synthesis filters; and
- a status updating module, adapted to:
  - excite a first synthesis filter corresponding to the first encoding rate by using the excitation signal of the first encoding rate,
  - output a reconstructed signal of a narrowband signal component, and
  - update status information of the first synthesis filter and status information of a second synthesis filter corresponding to a second encoding rate by using information of the reconstructed signal of the narrowband signal component.

9. The device for updating statuses of synthesis filters according to claim 8, wherein the status updating module comprises:

- a first updating sub-module, adapted to update the status information of the first synthesis filter by using the information of the reconstructed signal of the narrowband signal component; and
- a second updating sub-module, adapted to update the status information of the second synthesis filter by using the updated status information of the first synthesis filter.

10. The device for updating statuses of synthesis filters according to claim 8, wherein the status updating module comprises:

- a first updating sub-module, adapted to update the status information of the first synthesis filter by using the information of the reconstructed signal of the narrowband signal component; and
- a third updating sub-module, adapted to update the status information of the second synthesis filter by using the information of the reconstructed signal of the narrowband signal component.

* * * * *